United States Patent [19]
Phillips

[11] 3,936,336
[45] Feb. 3, 1976

[54] METHOD OF FORMING REINFORCED PLASTICS ARTICLES UTILIZING OPENWORK TUBES

[75] Inventor: Leslie Nathan Phillips, Farnborough, England

[73] Assignee: National Research Development Corporation, London, England

[22] Filed: Oct. 23, 1970

[21] Appl. No.: 83,457

[30] Foreign Application Priority Data
Oct. 24, 1969 United Kingdom............... 52192/69

[52] U.S. Cl. .............................. 156/86; 87/1; 87/6; 87/9; 156/148; 156/229; 264/86; 428/367; 428/375
[51] Int. Cl.² .................... B32B 31/14; B29C 27/00
[58] Field of Search ............ 161/175, 176; 156/148, 156/86, 229; 87/1, 6, 9; 264/86; 428/377, 375, 367

[56] References Cited
UNITED STATES PATENTS

| | | | |
|---|---|---|---|
| 2,602,766 | 7/1952 | Francis ............................ | 161/176 X |
| 2,685,813 | 8/1954 | Lampman et al............... | 161/176 X |
| 3,033,729 | 5/1962 | Shobert....................................... | 87/1 |
| 3,457,962 | 7/1969 | Shobert............................... | 161/176 |
| 3,855,897 | 12/1974 | Takahashi et al......................... | 87/1 |

FOREIGN PATENTS OR APPLICATIONS
1,110,791 4/1968 United Kingdom

OTHER PUBLICATIONS
"Modmor High Modulus Carbon Fibres" from Engineering Natl's and Design – Materials Selector and Converter, Mar. 1969, p. 7 of ad. between 80 & 81.
"Graphite Filaments Spur New 'Composites' Industry,"Modern Textiles Magazine, June 1969, pp. 28, 30 & 33.

Primary Examiner—Douglas J. Drummond
Assistant Examiner—Robert A. Dawson
Attorney, Agent, or Firm—Cushman, Darby & Cushman

[57] ABSTRACT

A reinforced plastic rod is produced by placing resin impregnated fibres within a tube of deformable openwork construction, for example braided or knitted material, arranged so that elongation of the tube results in a decrease in its cross section, elongating the tube so that it compacts the resin and fibres and also squeezes out excess resin through the openwork tube, and then curing the resin.

8 Claims, 3 Drawing Figures

U.S. Patent  February 3, 1976  3,936,336
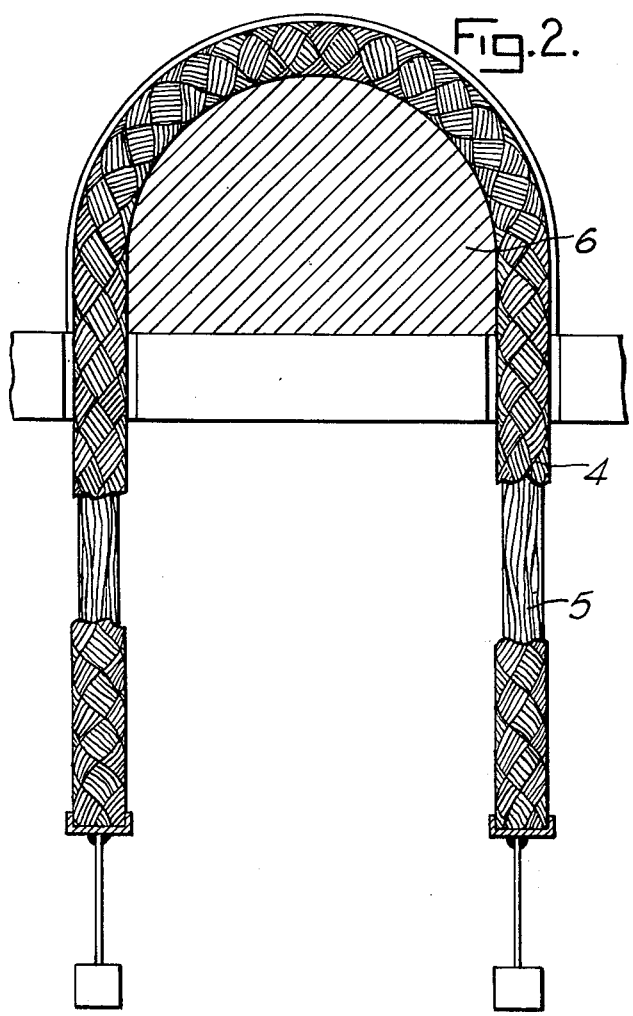

METHOD OF FORMING REINFORCED PLASTICS ARTICLES UTILIZING OPENWORK TUBES

The present invention is concerned with reinforced plastics and a method for the production thereof.

In accordance with the present invention a process for the production of a reinforced plastics article comprises the steps of placing the reinforcement and the plastics, in an uncured or part cured state, within a tube of deformable openwork construction, for example braided or knitted material, arranged so that elongation of the tube results in a decrease in its cross section, elongating said tube so that it compacts the plastics and reinforcement, and curing said plastics.

The reinforcement may be in the form of short randomly oriented lengths or preferably it may be in the form of extended lengths which are substantially continuous throughout the length of the rod which they are reinforcing. Advantageously the reinforcement comprises continuous lengths of carbon fibres of high modulus and high ultimate tensile strength, say modulus greater than about $20 \times 10^6$ p.s.i. and strength greater than about $100 \times 10^3$ p.s.i. such as may be obtained by the process described in U.K. Pat. Specification No. 1,110,791.

The plastic may be of the hot curing or cold curing variety. Suitable hot curing plastics include epoxy resins, phenol-formaldehyde resins, Friedel-Crafts resins or polyimides. By Friedel-crafts resins is meant the product of a condensation reaction between an aromatic compound having at least two halogeno-methyl (preferably chloromethyl) or alkoxymethyl (preferably methoxymethyl) groups attached directly to an aromatic nucleus and an aromatic compound having at least two nuclear hydrogen atoms available and activated toward such condensation reaction as disclosed in U.K. Pat. Specifications Nos. 1,024,222 and 1,094,181.

Cold curing plastics remain formable until an accelerator or catalyst is added to cause the curing reaction to take place; heat may or may not be required to assist in this curing reaction. It should be noted that once the catalyst has been added plastics of this type cure in a finite time and the steps of the present invention must be completed within the curing time of the system. Suitable cold curing resins include unsaturated polyesters, UV catalysed monomeric methyl methacrylate, amine hardened and polyamide hardened epoxy resins, furane resins and resorcinol/formaldehyde resins.

The braided or knitted tube is preferably of glass fibre, and may be removed from the rod after the plastic is cured or it may be left in position. The tube may alternatively be of braided or knitted carbon fibre, or a combination of glass and carbon fibre.

Embodiments of the invention will now be described by way of example with reference to the following drawings in which:

FIG. 1 illustrates a method of producing a reinforced plastic rod.

FIGS. 2 and 3 illustrate methods of producing a reinforced plastic article which conforms to the shape of a former.

Referring to FIG. 1 a method of producing a reinforced plastic rod is operated by charging a braided glass fibre tube 1 with a core of resin impregnated carbon fibre reinforcement 2, hanging the tube vertically by one end, attaching sufficient weights 3 to the other end to reduce the diameter of the braided tube thus causing the tube to closely fit and compact the resin impregnated fibres and also causing excess resin to be squeezed out through the braiding, and then curing the resin. Some of the resin penetrates the spaces within the braided material and this facilitates bonding between the tube and the fibre 2. This produces straight reinforced plastic rod of substantially circular cross-section.

The forces causing elongation of the braided tube need not be linearly opposed as can be seen with reference to FIG. 2 wherein a braided glass fibre tube 4 is charged with lengths of resin impregnated carbon fibre reinforcement 5 and is then hung over a former 6, tension is applied to both ends of the tube 4 and the resin is cured so that the reinforced plastic rod conforms to the shape of the former 6. The product of this process has a flattened cross-section.

The former may be treated with a parting agent to permit removal of the shaped rod produced or the former may be a thin sheet of material, for example, fibre glass, which it is sought to reinforce, in which instance an excess of plastic is arranged so that it seeps through the braided tube and attaches the rod to the material sought to be reinforced on curing. Other means such as a thermosetting or cold setting adhesive, may be used to attach the rod to the material sought to be reinforced.

Referring now to FIG. 3 a reinforced plastics tube is produced by arranging lengths of resin impregnated carbon fibre 7 around a tubular plastic former 8, feeding a braided glass fibre tube 9 over the carbon fibre and former causing the braided tube 9 to compact the carbon fibre within the annular space between the two tubes and the former, and then curing the resin. The former may be selected from a number of materials such as wood or metal of various cross sections dependent upon design requirements. The former may be separated from the fibre subsequent to curing.

I claim:

1. A process for the production of a reinforced plastics article comprising the steps of placing the reinforcement and the plastics, in an uncured or part cured state, within a tube of deformable openwork construction arranged so that elongation of the tube results in a significant decrease in its internal cross-sectional area cross-section, supporting the tube with at least a portion of the external surface of the tube exposed to allow a significant flow of said plastics through said surface, elongating said tube so that it compacts the plastics and reinforcement, and providing for the curing of said plastics.

2. A process for the production of a reinforced plastics article according to claim 1 wherein at least some of the fibrous reinforcement comprises carbon fibres.

3. A process for the production of a reinforced plastics article according to claim 2 wherein the openwork tube is constructed of braided fibre at least some of which is glass fibre.

4. A process for the production of a reinforced plastics article according to claim 2, wherein the openwork tube is constructed of braided fibre at least some of which is carbon fibre.

5. A process for the production of a reinforced plastics article according to claim 1 wherein said tube containing the plastics and reinforcement is placed over a former prior to the step of elongating so that the reinforced plastics article conforms to the shape of the former.

6. A process for the production of a reinforced plastics article comprising the steps of positioning lengths of fibre, in an uncured or part cured state, on to a former, feeding a tube of openwork construction arranged so that elongation of the tube results in a decrease in its cross section over the former and fibre, elongating said tube so that it compacts the plastics and reinforcement, and curing said plastics.

7. A method of making an oriented filamentary reinforced plastic article comprising the steps of
applying a plastic binder in a partially cured or uncured state to the filamentary material,
placing a tubular, flexible porous mold over the composite mass of binder and filaments,
stretching the tubular mold along its longitudinal direction thereby compressing radially the composite mass therein and aligning the filamentary material within the binder;
such radial compression forcing a flow of binder material through the walls of said porous mold, and curing the binder material.

8. A method as in claim 7, wherein the tubular mold containing the composite mass is subjected to a transverse force in at least one direction on at least a portion of the mold by forming the mold containing the composite mass over a shaper member before the binder material is cured.

* * * * *